Patented June 16, 1942

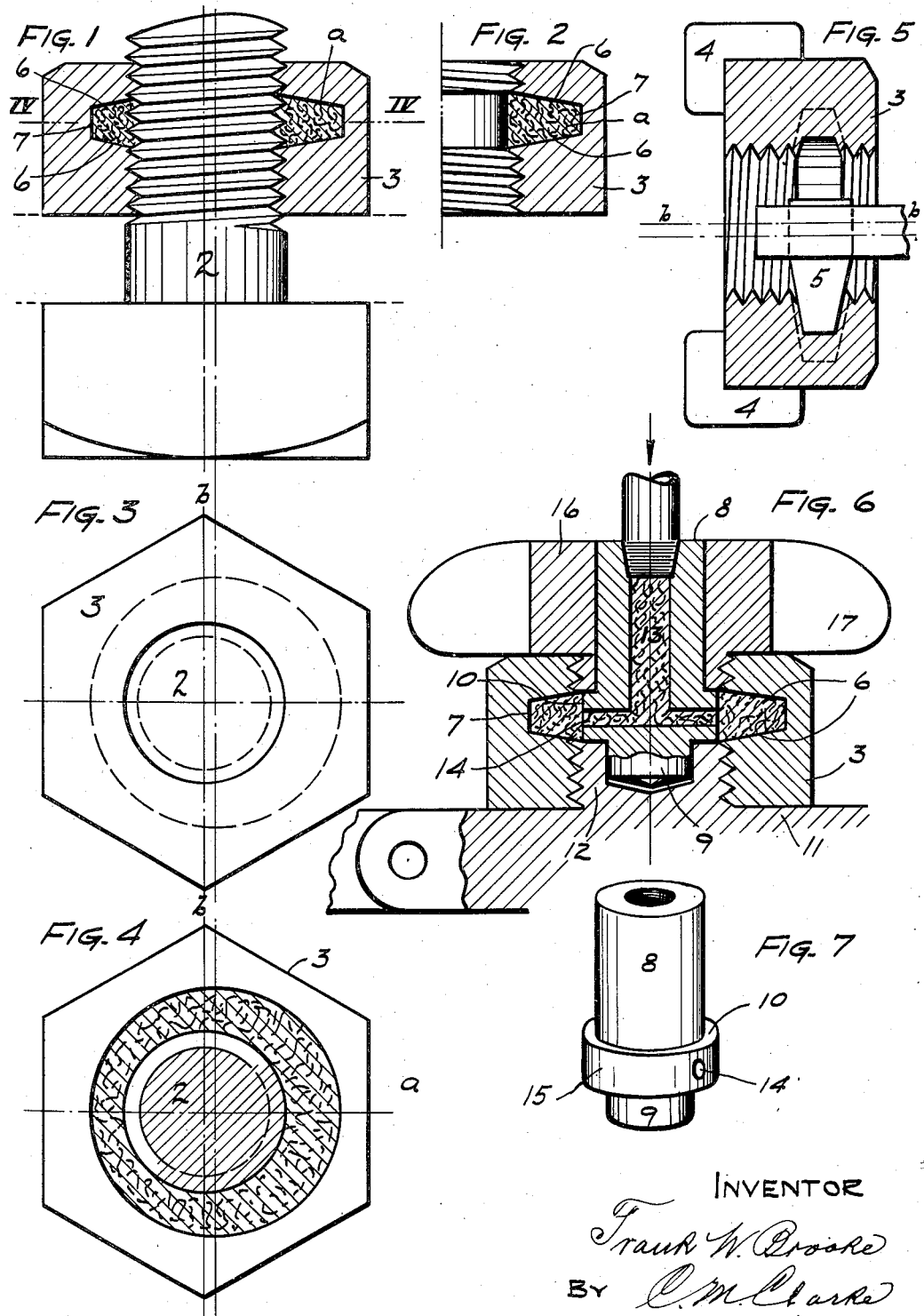

2,286,336

UNITED STATES PATENT OFFICE 2,286,336

SELF-LOCKING NUT AND METHOD OF MAKING SAME

Frank W. Brooke, Pittsburgh, Pa.

Application June 23, 1941, Serial No. 399,303

12 Claims. (Cl. 10—86)

This invention is an improvement in the general class of nut locks for preventing undesired loosening of a nut on its bolt because of vibration, wear, or other causes.

Specifically it utilizes a resilient cushioning body of suitable material immovably held within the interior of the nut and adapted to form, with the threaded end of the bolt, an intermediate close holding connection with its threads.

Heretofore such devices have been made and used by utilizing a special form of nut which is so constructed as to receive and fixedly hold and embrace the bolt-engaging holding unit. The present application relates to the final product as well as its method of manufacture as hereinafter described.

In the drawing showing one preferred form of the invention:

Fig. 1 is a view of a bolt with the improved nut and its inserted binding unit engaging the bolt threads, in section;

Fig. 2 is a sectional view of one half of the nut showing the unit as in position prior to application to the bolt;

Fig. 3 is a plan view of Fig. 1;

Fig. 4 is a cross section on the line IV—IV of Fig. 1;

Fig. 5 is a sectional view of a nut in process of formation of the interior eccentric unit-receiving cavity;

Fig. 6 is a sectional view illustrating the means for and operation of filling the cavity with plastic material, for formation of the unit;

Fig. 7 is an isometric view of the inserted feeder therefor.

Referring to the drawing, the bolt 2 and nut 3 are of usual conventional or standard construction and of any suitable metal, or dimensions as to length, diameter, gauge of threads, or shape of nut i. e. square, hexagonal, octagonal, etc., as desired.

Entirely within the body of the nut is the continuous annular thread engaging unit $a$. Such unit is of a composition sufficiently plastic and mobile for sufficient deformation to be acted upon by the entering terminal threads of the bolt as the nut is applied, and by compression and compensating movement, to become closely engaged by and with the threads throughout the depth of the unit. While any suitable substance or material may be utilized for such unit, as fibre, fibrous composition, comminuted cork, etc., I prefer to use a composition including asbestos fibre or other heat resisting material, and a binder.

For reception of the unit entirely within the main body of the nut, I provide a generally annular interior cavity preferably slightly eccentric of the axial center $b$—$b$ of the nut itself. Such cavity is provided in any suitable manner or by any well known means, such as a turning lathe wherein a nut is held by the chucks 4 for rotation eccentric of its axial center $b$, $b$. A suitable cutting tool 5 is inserted through the central threaded opening of the nut for formation of the annular cavity.

By so forming the cavity it will be observed that it is entirely within the main body of the nut. The annular cavity being slightly eccentric, as illustrated in Figs. 3 and 4, will firmly hold the unit $a$ when inserted and hardened, against rotation or loosening in use. The cavity is preferably made with converging walls 6 as shown in Figs. 1 and 2, and the said walls and the extreme outer annular wall 7 of the cavity are preferably left somewhat rough or irregular, for the purpose of insuring a further holding action on the unit $a$.

Fig. 6 illustrates one means of filling the cavity with the plastic or semi fluid material $a$, preferably at an increased temperature, facilitating flow thereinto.

For such purpose a cylindrical filling head 8 having a centralizing terminal 9 and an intermediate enlarged flange-like annular feeding portion 10, is inserted into the receptive opening of a base 11, preferably forming one of a series of moving carrier units or links, as in a continuous chain. Each base 11 is provided with an upstanding threaded stud 12 upon which the nut 2 is screwed, as shown, and against which the lower face of annular flange 10 bears.

The head 8 is provided with a central supply opening 13 and lateral ports 14 extending through the annular face 15 of the head. The latter is of such diameter as to be located within the inner diameter of the nut threads as shown, and provide an inner straight annular molding wall for the unit when finished, thus providing ample inner portions for insertion and formation of the final holding threads, upon being engaged by the threads of the inserted bolt.

Fig. 6 illustrates such application and also the utilization of a clamping head 16 having annular turning members 17 of any suitable formation, for rotation by hand or tool engagement. When head 16 is inserted as shown, in threaded engagement with the outer end of the nut and in tight clamping engagement against the upper face of the enlarged feeding and forming head 10, soft material, as by pre-heating, for formation of the unit is inserted through cavity 13 and lateral ports 14, completely filling the eccentric annular space of the nut. Becoming sufficiently hardened therein by application of an air blast or the like, the head 16 and filling head 8 may be removed, leaving the nut provided with its unit a, as in Fig. 2.

Upon removal of clamping head 16 and feeder head 8, the nut and its contained unit a may then be removed from stud 12, and is ready for application to a bolt.

The construction and method of making my improved self locking nut will be clearly understood and appreciated by all those skilled in the art. It is extremely simple and economical to make and use, very efficient in operation and positively overcomes and compensates for vibration loosening.

The length of any commercial size of nut from the largest to the smallest is not increased, and the nut and its internal thread-engaging unit may be handled commercially as a standard article.

It eliminates all axial play by firm compressed engagement with the threads of the bolt when applied thereto and maintains constant pressure on the load carrying side of the threads.

What I claim is:

1. In the manufacture of self locking nuts, the method consisting in forming an interior annular cavity between the ends of the nut and filling said cavity with a thread engaging plastic fibrous substance by flowing same thereinto under pressure around an inner annular hole forming surface prior to and then effecting subsequent densification of said fibrous substance.

2. In the manufacture of self locking nuts, the method consisting in forming an interior annular cavity between the ends of the nut and filling said cavity with a thread engaging plastic fibrous substance around a middle bolt hole flush with the small diameter of the nut threads by forcing said substance while in a fluent condition into the cavity around a hole defining surface and then hardening the substance in unit form.

3. In the manufacture of self locking nuts, the method consisting in forming an eccentrically enlarged interior annular cavity extending laterally beyond the normal threads of the nut and between its ends and filling said cavity with a mobile fibrous thread engaging substance around a middle hole defining surface and hardening the formed substance in position as a unit.

4. In the manufacture of self locking nuts, the method consisting in forming an eccentrically enlarged interior annular cavity extending laterally beyond the normal threads of the nut and between its ends and filling said cavity with a semi-fluid substance composed of asbestos fibre and a binder and then hardening the formed substance in position as a unit.

5. In the manufacture of self locking nuts, the method consisting in forming an interior annular cavity between the ends of the nut and filling said cavity with a plastic fibrous thread engaging substance by flowing same thereinto under pressure prior to hardening and effecting subsequent densification around a middle annular smooth hole forming member.

6. A standard nut of conventional form provided with opposite end-portion-threads and intermediate thereof with an interior thread holding unit of comminuted fiber and a binder, said unit having a bolt hole opening of a diameter approximating that of the small diameter of an engaged bolt and of an initially mobile plastic and finally compressed and hardened consistency.

7. A nut of conventional form having between its opposite threaded ends an interior annular cavity filled with a thread engaging unit of comminuted fiber and a binder applied in heated condition and cooled and hardened in position.

8. A nut of conventional form having between its opposite threaded ends an interior annular cavity filled with a thread engaging unit of asbestos fiber and a binder applied in solution in plastic condition and hardened in position.

9. A nut of conventional form having between its opposite threaded ends an interior annular cavity filled with a thread engaging unit of asbestos fiber and a binder applied in mobile condition and compressed, hardened and cooled in position.

10. A nut having between its opposite threaded ends an interior annular cavity filled with a thread engaging unit of asbestos fiber and a binder applied in an initially soft mobile condition and finally compressed and hardened in position and provided with a middle bolt engaging hole.

11. A nut having between its opposite threaded ends an interior annular eccentrically disposed cavity filled with a thread engaging unit of asbestos fiber and a binder applied in an initially soft mobile condition and finally compressed and hardened in position and provided with a middle smooth surface bolt engaging hole.

12. A nut having between its opposite threaded ends an interior annular outwardly converging cavity filled with a thread engaging unit of asbestos fiber and a binder applied in an initially soft mobile condition and finally compressed and hardened in position and provided with a middle smooth surface bolt engaging hole.

FRANK W. BROOKE.